N. CONARROE.
Cane-Stripper.
No. 56,185.
Patented July 10, 1866.
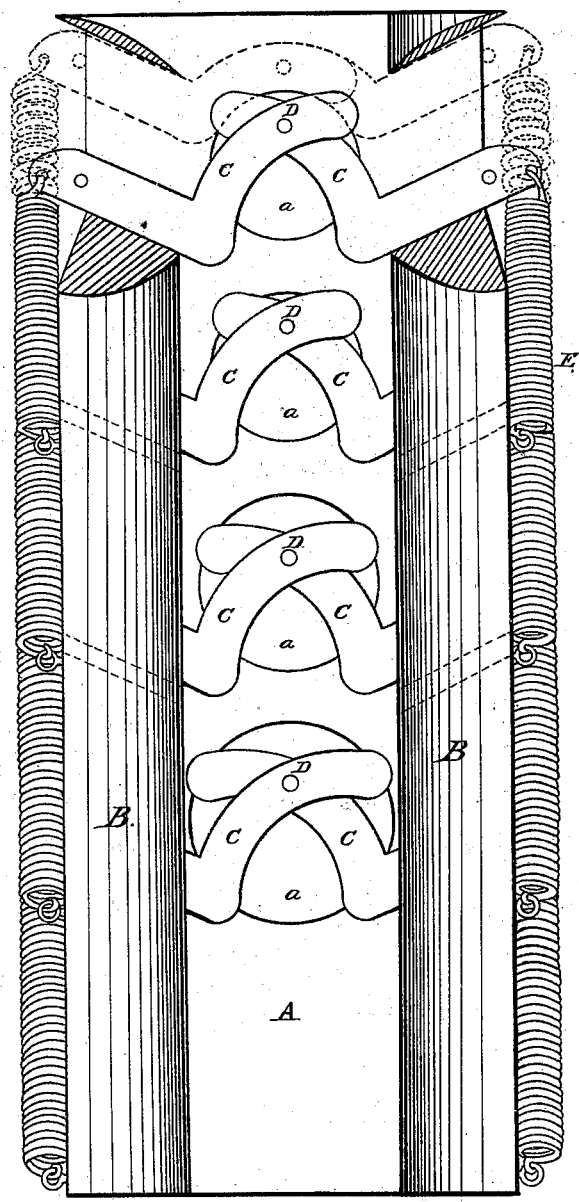
Witnesses:
H. F. Hall
James L. Ewin
Inventor:
Robert Conarroe
By Munn & Co. Attorneys

UNITED STATES PATENT OFFICE.

ROBERT CONARROE, OF CAMDEN, OHIO.

IMPROVEMENT IN SORGHUM-MILLS.

Specification forming part of Letters Patent No. 56,185, dated July 10, 1866.

*To all whom it may concern:*

Be it known that I, ROBERT CONARROE, of Camden, in the county of Preble and State of Ohio, have made a new and useful Improved Cane Stripper and Feeder for Cane-Mills; and I do hereby declare the following to be a full, clear, and exact description of the nature, construction, and operation of the same, sufficient to enable one skilled in the art to which it appertains to construct and use it, reference being had to the accompanying drawing, which is made part of this specification, and in which my improvement is represented by a front elevation, a portion at the upper end being removed to show the configuration of the jointed strippers.

This improved cane stripper and feeder is to be set in a vertical position in advance of the mill, the openings $a$ forming throats through which the small end of the cane is introduced and presented to the rollers, by which it is drawn through the strippers, the leaves or blades being torn off the stalks in their passage through the throats, which expand by the increase in size of the stalks.

In the drawings, A is a board or plate having openings $a$, which may be of diverse sizes, if required, so that in the selection of stalks the larger may be introduced below and the smaller above. B B are side plates fastened to the plate A, but leaving intervals between the two in which the pivoted strippers slide as the cane presses them open.

The strippers consist of two pieces, C C, pivoted together at D, and capable of being expanded into the position shown at the upper end in red lines by a cane or stalk which occupies the whole size of the orifice $a$.

The springs E constantly tend to bring the jaws C of the strippers to their closed position, and by this means the passing cane is closely embraced, the blade being peeled off and dropped on the side away from the rolls.

It is needless to specify particularly the necessity for stripping the blades from the cane before grinding the latter, as it is well known that the leaves only contain unelaborated juices in which the saccharine quality is imperfectly developed. While they constitute the laboratory of the plant, they do not immediately furnish the saccharine juice in the desirable condition. The addition of the juice of the blade is injurious to the sirup, and they also may absorb some of the more valuable saccharine juice of the stalk.

What I claim as new, and desire to secure by Letters Patent, is—

The series of pivoted stripper-jaws arranged in reference to the row of openings and provided with springs, substantially as and for the purpose described.

ROBERT CONARROE.

Witnesses:
   WILLIAM L. HUPPNER,
   G. W. JONES.